May 3, 1932.     A. F. DAY     1,856,470
REMOVABLE CHILLERING JIG FOR PIPE WELDING
Filed May 5, 1931
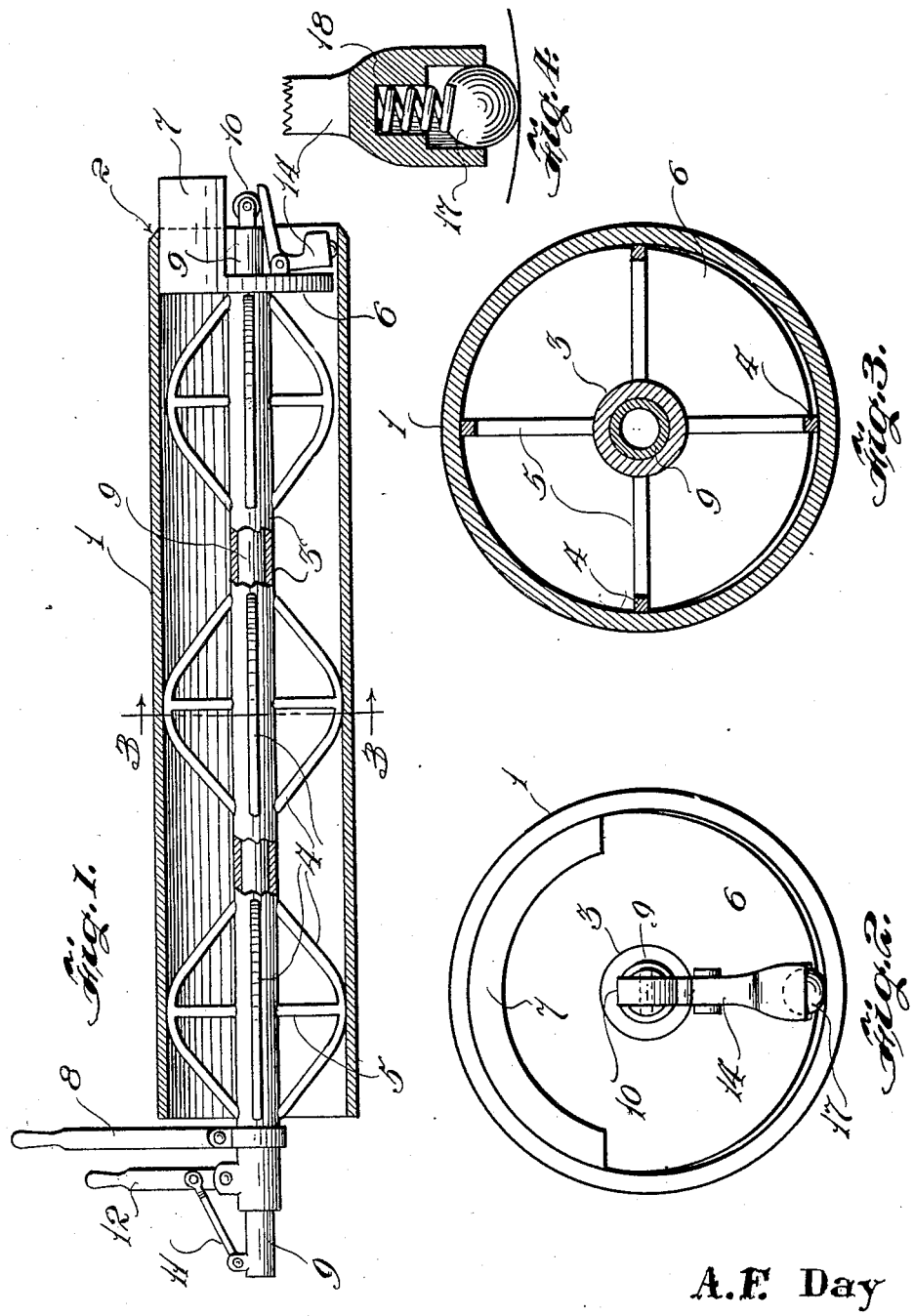
A. F. Day
INVENTOR.
BY John M. Spellman
ATTORNEY.

Patented May 3, 1932

1,856,470

UNITED STATES PATENT OFFICE

ANDREW F. DAY, OF DALLAS, TEXAS, ASSIGNOR TO A. F. DAY CONSTRUCTION COMPANY, OF DALLAS, TEXAS, A CORPORATION OF TEXAS

REMOVABLE CHILLERING JIG FOR PIPE WELDING

Application filed May 5, 1931. Serial No. 535,217.

This invention has relation to devices used in the welding of pipe, that is to hold the pipe sections or joints in perfect alinement while the welding is being done.

In the welding of pipe it is essential that the pipe sections be held in perfect alinement with one another and it is also necessary and important that the "icicles" or metal which would tend to drop or flow between the joints be prevented from doing so, as this forms a projection on the inside of the pipe, deleterious to the passage of oil, for instance, through the pipe, after the welded pipes are placed in a line.

It is the primary object of this invention to provide a device which will hold the pipe sections in perfect alinement and effectually prevent icicles from forming on the inside of the pipe.

Another important object of the invention resides in the novel form of construction thereof wherein the device, after a joint has been welded, may be removed easily from the pipe without jamming or becoming caught in the pipe.

With the above and other objects in view, the invention will be better understood from a perusal of the following detailed description, taken in connection with the accompanying drawings, and wherein:

Figure 1 represents a longitudinal sectional view through a piece or section of pipe and illustrating the device in operative position therein.

Figure 2 is an end elevational view taken from the right of Figure 1.

Figure 3 is a cross-sectional view, taken on the line 3—3 of Figure 1; and

Figure 4 is a detail view in section showing a ball bearing support for one end of the device.

Having a more detailed reference to the drawings, in Figure 1 the numeral 1 denotes a section of pipe with beveled end 2, with the device in position therein preparatory to welding or in the welding position for joining one section of pipe to another section. The invention comprises a hollow rod or tubing 3 with a plurality of spaced resilient supporting members 4 and 5 joined thereto for the purpose of holding the tubing resiliently against the inner periphery of the pipe 1 to maintain the device in alinement with the pipe. The forward end of this tubing carries a disk 6 formed integrally with a semi-circular flange 7. The rear end of this tubing 3 carries a handle 8 rigidly fastened thereto for the purpose of rotating the tubing carrying the flange 7 to shift the latter to different position around the inner periphery of the pipe as the welding is being done.

Slidably positioned within the tubing 3 is another hollow rod or tubing 9, carrying on its forward end a roller 10. This tubing has a link 11 by means of which it is pivotally connected to a lever or handle 12, similarly mounted on the tubing 3. This tubing 9 serves to enable the tubing 3, carrying the flange 7, to be pressed upwardly to cause the flange to bear against the inner periphery of the pipe when welding is being done. For this purpose there is mounted on the disk 6 a pivotal support 14 with a ball bearing 17 under spring tension 18.

In operation of the device, which may be termed a removable chillering jig, it is placed inside the pipe with the flange under adjoining joints. Then the handle or lever 12 is moved forwardly to cause the roller 10 to ride upon the support 14. This will lift the flange against the pipe closely to prevent metal from leaking inside the pipe and the welding is begun. The bevelled edges 2 of each pipe are melted or welded together which leaves a slight rise just over the joint, but leaves the interior of the pipe smooth. After a portion of the welding is performed, the handle 12 is moved backwardly to lower the flange then the handle 8 is turned to rotate the tubing 3 to another section to be welded, and the lever 12 again moved to tighten the flange in engaging position. The ball bearing 17 enables the support 14 to remain slightly in engagement with the roller 10 sufficient to allow the parts to be rotated. The members 4 and 5 at the forward part of the device are free of engagement with the walls of the pipe when a welding is being made, but these members to the rear are engaged with the pipe to hold the device in alinement. The device can be very easily removed from the pipe without jamming by movement of the lever 12 backwardly and pulling the handle 8 which withdraws the tubing and parts from a pipe.

The invention is capable of modifications in keeping with the spirit thereof and in the scope and meaning of the appended claims.

What is claimed as new is:

1. A removable chillering jig for use in welding pipe and comprising a main hollow rod having a disk secured to one end thereof, an arc-shaped flange formed integrally with the disk, the said flange adapted to be pressed against the inside of the pipe at the joints; a support pivotally connected to the disk, to permit the support and disk to ride around the inner periphery of the pipe in shifting the flange to progressive welding positions on the pipe; handles on the opposite end of the main rod for shifting the rod and said flange; and a second hollow rod slidably arranged with and cooperating with the main hollow rod for moving the flange to engagement with and release from said pipe.

2. A removable chillering jig for use in pipe welding, comprising a main hollow rod having a disk secured to one end thereof, a flange secured to said disk, a pivotal support mounted on the disk and extending beyond the edge thereof; a plurality of resilient members mounted on the main rod in spaced relation and adapted to bear against the inner periphery of the pipe in holding the jig in centralized position in the pipe; a second hollow rod slidably arranged inside the main rod; means for actuating the main rod to rotate it to positions in the pipe, and means for actuating the second rod to cause the disk to bear against the pipe joints inside the pipe and including means for holding the rods in welding position and for releasing the same from said position.

3. A removable chillering jig for pipe welding comprising two rods one slidably arranged within the other, means mounted on the outside rod for holding the jig in centralized position inside the pipe to be welded, means on the outside rod for engaging the joints of a pipe on the inside thereof in welding to prevent icicles of metal from forming; said means for engaging the joints including handles for shifting the rods to different operating position and for holding the same in such positions, an arc shaped flange carried by a disc secured to one of said rods.

4. In a device of the character described comprising a hollow rod, a disc secured to one end of said rod, an arc shaped flange secured to said disc and extending beyond the edge of said disc, at least two resilient supporting means secured to said hollow rod for supporting said rod in a centralized position within a pipe, handles secured to said rod, a support pivotally connected to said disc, a bearing secured in said support, a rod slidably mounted within said hollow rod, a roller carried by the end of said slidable rod for cooperating with said support for causing the said flange to bear against the inner surface of the pipe, and means for connecting the slidable rod to one of the handles carried by said hollow rod.

5. In a device of the class described comprising a hollow rod, space resilient means carried by said hollow rod, a disc carried by one end of said hollow rod, a flange connected to said disc, pivotally supporting means connected to said disk, a spring pressed bearing means carried by said support, a rod slidably mounted in said hollow rod and adapted to cooperate with said support in forcing the bearing against the inner surface of the pipe to press the said flange against the inner surface of the pipe, and handles carried by said hollow rod for shifting said hollow rod and sliding said shiftable rod.

6. In a device of the class described comprising a hollow rod, a disc secured to one end of the said rod, a flange secured to said disc, resilient supporting means secured to said hollow rod for supporting said rod in a centralized position within a pipe, handles secured to said rod, an L shaped support pivotally connected to said disc, a spring pressed bearing means carried by said support, a rod slidably mounted within said hollow rod, a roller carried by one end of said slidable rod for cooperating with said support and causing said flange to bear against the inner surface of the pipe, and a link for connecting the slidable rod to one end of said handles carried by said hollow rod.

In testimony whereof I affix my signature.

ANDREW F. DAY.